US005292367A

United States Patent [19]

Bloys et al.

[11] Patent Number: 5,292,367
[45] Date of Patent: Mar. 8, 1994

[54] DISPERSANT COMPOSITIONS FOR SUBTERRANEAN WELL DRILLING AND COMPLETION

[75] Inventors: James B. Bloys; William N. Wilson, both of Plano; Edward Malachosky, Coppell; Robert B. Carpenter, Hurst; Roger D. Bradshaw, Allen, all of Tex.

[73] Assignee: Atlantic Richfield Company, Los Angeles, Calif.

[21] Appl. No.: 982,024

[22] Filed: Nov. 24, 1992

Related U.S. Application Data

[63] Continuation of Ser. No. 887,227, May 18, 1992, abandoned, which is a continuation of Ser. No. 510,638, Apr. 18, 1990, abandoned.

[51] Int. Cl.$^5$ .................. C04B 24/04; C04B 24/06; C04B 24/00
[52] U.S. Cl. ..................... 106/802; 106/724; 106/725; 106/727; 106/808; 106/809; 106/810; 166/293; 166/294; 252/8.551; 405/266; 405/267
[58] Field of Search ................ 252/8.51, 8.55, 8.551, 252/8.552; 106/719, 724, 725, 727, 802, 808, 809, 810, 811, 819; 166/293, 294; 405/266, 267

[56] References Cited

U.S. PATENT DOCUMENTS

| | | | |
|---|---|---|---|
| 2,650,905 | 9/1953 | Fordyce et al. | 252/8.5 |
| 2,718,497 | 9/1955 | Oldham et al. | 252/8.5 |
| 3,234,154 | 2/1966 | Martin | 260/17.5 |
| 3,409,080 | 11/1968 | Harrison | 166/31 |
| 3,421,584 | 1/1969 | Eilers et al. | 166/33 |
| 3,730,900 | 5/1973 | Perricone et al. | 252/8.5 |
| 3,952,805 | 4/1976 | Persinski et al. | 166/293 |
| 4,015,991 | 4/1977 | Persinski et al. | 106/90 |
| 4,036,660 | 7/1977 | Persinski et al. | 106/90 |
| 4,126,009 | 11/1978 | Tomic | 106/802 |
| 4,183,406 | 1/1980 | Lundberg et al. | 166/295 |
| 4,282,130 | 8/1981 | Lundberg et al. | 260/29.6 |
| 4,302,341 | 11/1981 | Watson | 252/8.55 |
| 4,304,300 | 12/1981 | Watson | 166/291 |
| 4,313,862 | 2/1982 | Lundberg et al. | 260/29.6 |
| 4,322,329 | 3/1982 | Lundberg et al. | 524/389 |
| 4,361,658 | 11/1982 | Lundberg et al. | 523/132 |
| 4,425,463 | 1/1984 | Walker et al. | 524/400 |
| 4,476,029 | 10/1984 | Sy et al. | 252/8.5 |
| 4,505,827 | 3/1985 | Rose et al. | 252/8.55 |
| 4,518,510 | 5/1985 | Gleason et al. | 252/8.5 |
| 4,542,791 | 9/1985 | Drake et al. | 166/291 |
| 4,552,939 | 11/1985 | Thaler et al. | 526/287 |
| 4,579,927 | 4/1986 | Patel et al. | 527/400 |
| 4,601,758 | 7/1986 | Nelson | 106/90 |
| 4,632,186 | 12/1986 | Boncan et al. | 166/293 |
| 4,646,834 | 3/1987 | Bannister | 166/291 |
| 4,663,366 | 5/1987 | Drake et al. | 523/130 |
| 4,675,119 | 6/1987 | Farrar et al. | 252/8.514 |
| 4,680,128 | 7/1987 | Portnoy | 252/8.511 |
| 4,683,953 | 8/1987 | Eustace et al. | 166/294 |
| 4,711,731 | 12/1987 | Garvey et al. | 252/8.514 |
| 4,715,971 | 12/1987 | Blair | 252/8.51 |
| 4,728,445 | 3/1988 | Hale | 252/8.514 |
| 4,740,318 | 4/1988 | Hale et al. | 252/8.514 |
| 4,762,894 | 8/1988 | Fong et al. | 525/344 |
| 4,770,795 | 9/1988 | Giddings et al. | 252/8.514 |
| 4,782,120 | 11/1988 | Rousset et al. | 525/326.6 |
| 4,806,164 | 2/1989 | Brothers | 106/90 |
| 4,812,244 | 3/1989 | Lawson et al. | 252/8.514 |
| 4,814,389 | 3/1989 | Garvey et al. | 525/329.9 |
| 4,826,611 | 5/1989 | Blair | 252/8.51 |
| 4,883,125 | 11/1989 | Wilson et al. | 175/66 |
| 5,030,366 | 7/1991 | Wilson et al. | 252/8.551 |

FOREIGN PATENT DOCUMENTS 0207536 1/1987 European Pat. Off. .

Primary Examiner—Mark L. Bell
Assistant Examiner—Deborah Jones
Attorney, Agent, or Firm—Haynes and Boone

[57] ABSTRACT

A dispersant for spacer fluids, cement slurries, completion fluids and mixtures of drilling fluids and cement slurries used for drilling and cementing subterranean wells.

20 Claims, No Drawings

DISPERSANT COMPOSITIONS FOR SUBTERRANEAN WELL DRILLING AND COMPLETION

This is a continuation of copending application(s) Ser. No. 07/887,227 filed on May 18, 1992, now abandoned, which was a continuation of Ser. No. 07/510,638 filed on Apr. 18, 1990 now abandoned.

BACKGROUND OF THE INVENTION

1. Field of the Invention

The present invention pertains to compositions for use in the drilling and completion of subterranean wells. More specifically, the present invention relates to dispersants for spacer fluids, cement slurries and mixtures of drilling fluids and cement slurries.

2. Description of the Prior Art

Techniques are well known for drilling and completing wells, particularly gas and oil wells, which are drilled from the surface of the earth to a subterranean formation containing a fluid mineral which it is desired to recover. After the fluid-containing geologic formation is located by investigation, a borehole is drilled through the overlying layers of the earth's crust to the fluid-containing geologic formation to permit recovery of the fluid mineral contained therein.

The drilling fluids used during drilling of the borehole are generally classified on the basis of their principal component. When the principal ingredient is a liquid (water or oil) the term "mud" is applied to a suspension of solids in the liquid. The most common drilling fluids contain water as the principal component. These drilling fluids are known as water-base drilling fluids or "water muds".

Water-base drilling fluids vary widely in composition and properties and many have been classified based on their principal ingredients. Some common classifications of water-base drilling fluids are freshwater muds, low solid muds, spud muds, salt water muds, lime muds, gyp muds and CL-CLS muds.

In addition to water, drilling fluids often include any number of known additives which perform various functions in the drilling fluid system. Among the most common additives are materials which increase density such as barite and galena and viscosifiers or thickening agents such as clays (usually bentonite).

Furthermore, many water-base drilling fluids are formulated to contain one or more polymeric additives which serve to reduce the rate of filtrate loss, stabilize clays, flocculate drilled solids, increase carrying capacity, emulsify, lubricate and the like. Among the most commonly employed polymeric additives are starches, guar gum, xanthan gum, sodium carboxy-methylcellulose (CMC), hydroxyethylcellulose (HEC), carboxy methyl hydroxyethyl cellulose (CMHEC) and synthetic water dispersable polymers such as acrylics and alkylene-oxide polymers.

Also well known and important for their ability to reduce flow resistance and gel development in clay-water muds are materials which are broadly referred to in the drilling fluid industry as "dispersants". Materials conventionally used as dispersants are classified as plant tannins, polyphosphates, lignitic materials, synthetic water dispersable polymers and lignosulfonates.

When the drilling of the borehole is completed, a casing is secured in position within the borehole to insure permanence of the borehole and to prevent entry into the well of a fluid from a formation other than the formation which is being tapped. The well casing is typically cemented in place by pumping a cement slurry downwardly through the casing. The cement slurry flows out of the open lower end of the casing at the well bottom and then upwardly around the casing in the annular space between the outer wall of the casing and the wall of the well borehole. Frequently, a spacer fluid is pumped downwardly through the casing ahead of the cement slurry to form a buffer between and prevent the contact of the drilling fluid and the cement slurry which are typically incompatible fluids.

The drilling process which produces the borehole will usually leave behind on the wall of the borehole produced, a drilling fluid filter cake of mud-like material. This material is a barrier to the formation of proper bonding by any cement composition employed to produce an impermeable bond between the casing and the well wall.

In an ideal cementing operation the drilling fluid filter cake would be removed from the well bore wall and replaced by the cement slurry to permit the formation of a solid layer of hardened, cured and bonded cement between the casing and the geologic formations through which the well borehole passes. It has been recognized in the art that removal of the drilling fluid filter cake is greatly enhanced by injecting the cement slurry, spacer fluid or the like into the well borehole under turbulent flow conditions, Inducing turbulence by control of flow velocity alone requires a specific minimum velocity, which in turn is limited by the maximum pressure the wellbore can tolerate. Particularly, where the turbulence induced is sufficient to assure removal of the drilling fluid filter cake, additional pumping capacity and very high pressure levels are usually required. These required pressure levels, especially for deep wells, often exceed the pressure at which the subterranean formations break down, resulting in lost circulation. In addition, the required pressure level may exceed the capacity of the pumping equipment or the endurance of the well drilling and associated apparatus.

The pumping of cement slurries in turbulent flow at lower flow velocities than would be possible using conventional cement slurry compositions, has been accomplished in the prior art by adding to the said cement slurries a flow-property-improving and turbulence-inducing agent, which agent is also known as a dispersant.

In the cementing of oil and gas wells, rather than displacing and removing the drilling fluid during cement slurry placement, it has been proposed to convert the drilling fluid to a cementitious slurry for cementing casing or tubing in place or otherwise stabilizing or protecting the casing by sealing the formation in the vicinity of the borehole.

The conversion of drilling fluid or "mud" to a cement slurry, however, is not without some operational problems and undesirable compositional changes. For example, the addition of cementitious materials such as mixtures of lime, silica and alumina, or lime and magnesia, silica and alumina and iron oxide, or cement materials such as calcium sulphate and Portland cements to aqueous drilling fluids can substantially increase the viscosity of the fluid mixture and result in severe flocculation. Efforts to circulate such mixtures through a wellbore can result in a highly unsatisfactory circulation rate, plugging of the wellbore annulus, breakdown of the earth formation in the vicinity of the wellbore and a failure of the cement slurry to properly mix.

These problems can be overcome by the addition of a dispersant composition which disperses both the drilling fluid and the cement slurry mixture. However, conventional drilling fluid dispersants do not necessarily disperse cement slurries and conventional cement slurry dispersants do not necessarily disperse drilling fluids. In addition, conventional dispersants which do disperse both drilling fluids and cement slurries do not necessarily disperse mixtures of drilling fluids and cement slurries.

It is known in the art that hydroxypropyl acrylate-acrylic acid copolymer, sulfonated vinyl toluene-maleic anhydride copolymer, sulfonated vinyl toluene-maleic acid copolymer, sulfonated methyl, ethyl, or phenyl polyacrylamide, and copolymers of ethylenic acids, acrylamides and ethylenic esters of phosphoric acid, and the sodium salts thereof act as dispersants or deflocculants in drilling fluids.

Dispersant compositions typically exhibit varying properties and performance under different conditions. The performance of dispersant compositions may be evaluated in applications such as, drilling fluid dispersion, mud-to-cement dispersion, cement dispersion, low salt-low hardness mud dispersion, high salt-high hardness mud dispersion and at high temperature in all of the preceding applications.

The present invention has been developed with a view to providing improved dispersant compositions that control rheological properties of, enhance filtrate control in, and disperse one or more of spacer fluids, cement slurries and mixtures of drilling fluids and cement slurries.

SUMMARY OF THE INVENTION

The present invention provides compositions for dispersing one or more of spacer fluids, cement slurries and mixtures of drilling fluids and cement slurries. The dispersant compositions control rheological properties of and enhance filtrate control in spacer fluids, cement slurries and mixtures of drilling fluids and cement slurries.

According to the present invention the dispersants comprise polymers including hydroxypropyl acrylate-acrylic acid copolymer; sulfonated vinyl toluene-maleic anhydride copolymer; sulfonated vinyl toluene-maleic acid copolymer; sulfonated methyl, ethyl or phenyl polyacrylamide; copolymers of ethylenic acids, acrylamides and ethylenic esters of phosphoric acid; acrylic acid polymers; acrylamide polymers; and sulfonated and/or phosphonated copolymers of acrylic acid and acrylamide. The sulfonate, phosphonate, phosphate and carboxylic acid groups on the polymers may be present in neutralized form as alkali metal or ammonium salts.

Those skilled in the art will further appreciate the above-described features of the present invention together with other superior aspects thereof upon reading the detailed description which follows.

DESCRIPTION OF PREFERRED EMBODIMENTS

The present invention relates to dispersants that control the rheological properties of, enhance filtrate control in and disperse one or more of spacer fluids, cement slurries and mixtures of drilling fluids and cement slurries.

According to the present invention, the molecular weight of the dispersants preferably is in the range of 1,000–15,000, and most preferably, is in the range of 2,000–10,000.

In addition, it is preferred that the dispersants have a high density of anionic charge, because the surface of the particles to be dispersed have some degree of positive charge. It is also preferred that the dispersants include anionic charge supplying functional groups such as sulfonate, phosphonate, phosphate and carboxylate groups.

In mixtures which include drilling fluids, it is preferred that the dispersants contain sulfonate or phosphonate groups when good salt tolerance is desired. It is also preferred that when good salt tolerance is desired, the dispersants include sulfonate or phosphonate groups in conjunction with polar nonionic groups, hydroxyl groups, aliphatic ester groups and alkylene oxide groups. In addition, the more salt tolerant dispersants tend to have fewer carboxylate groups which are more sensitive to divalent ions than are sulfonate or phosphonate groups.

In cement slurries and mixtures of drilling fluids and cement slurries, it is preferred that the dispersants contain a carboxylate group which has a high affinity for the calcium molecules contained in the cement slurry.

According to the present invention the dispersants comprise polymers including hydroxypropyl acrylate-acrylic acid copolymer; sulfonated vinyl toluene-maleic anhydride copolymer; sulfonated vinyl toluene-maleic acid copolymer; sulfonated methyl, ethyl or phenyl polyacrylamide; copolymers of ethylenic acids, acrylamides and ethylenic esters of phosphoric acid; acrylic acid polymers; acrylamide polymers; and sulfonated and/or phosphonated copolymers of acrylic acid and acrylamide. The sulfonate, phosphonate, phosphate and carboxylic acid groups on the polymers may be present in neutralized form as alkali metal or ammonium salts.

As noted above, it is known in the art that hydroxypropyl acrylate-acrylic acid copolymer, sulfonated vinyl toluene-maleic anhydride copolymer, sulfonated vinyl toluene-maleic acid copolymer, sulfonated methyl, ethyl or phenyl polyacrylamide, and copolymers of ethylenic acids, acrylamides and ethylenic esters of phosphoric acid, and the sodium salts thereof are dispersants or deflocculants for drilling fluids.

It has been determined according to the present invention that the above dispersants for drilling fluids have utility as dispersants for spacer fluids, cement slurries and mixtures of drilling fluids and cement slurries. Specifically, the sodium salts of hydroxypropyl acrylate-acrylic acid copolymers having a molecular weight of approximately 5,000 such as those which are commercially available from the National Starch and Chemical Corporation of Bridgewater, N.J., under the trade designation Narlex LD-42 (50% solids, aqueous solution) and Narlex D-42 (dry), have been found to be useful as dispersants for spacer fluids, cement slurries and mixtures of drilling fluids and cement slurries.

In addition, sulfonated vinyl toluene-maleic anhydride copolymers and sulfonated vinyl toluene-maleic acid copolymers such as those described in U.S. Pat. No. 4,,518,510, the disclosure of which is specifically incorporated herein by reference, which copolymers are commercially available from the National Starch and Chemical Corporation of Bridgewater, N.J., under the trade designation Narlex D-82 have been found to be useful as dispersants for spacer fluids, cement slurries and mixtures of drilling fluids and cement slurries.

The Narlex D-82 material that is commercially available from the National Starch and Chemical Corporation has a molecular weight of 25,000, a molar ratio of vinyl toluene to maleic anhydride or maleic acid of about 1:1 to less than about 2:1, and 0.7 sulfonic acid groups per vinyl toluene group. The 25,000 molecular weight copolymer shows modest activity. It is believed, however, that sulfonated vinyl toluene-maleic anhydride copolymers and sulfonated vinyl toluene-maleic acid copolymers having a molecular weight ranging from 2,000-12,000 would demonstrate superior performance.

Additionally, certain sulfo-alkyl amide or sulfo-arylamide polymers such as those described in U.S. Pat. Nos. 4,762,894 and 4,770,795, the disclosures of which are specifically incorporated herein by reference, which copolymers are commercially available from Nalco Chemical Company of Sugarland, Tex. under the trade designation ASP-718 have been found to be useful as dispersants for spacer fluids, cement slurries and mixtures of drilling fluids and cement slurries. The polymers marketed under this trade designation include sulfonated methyl, ethyl or phenyl polyacrylamides.

Moreover, certain copolymers of ethylenic acids, acrylamides and ethylenic esters of phosphoric acid such as those described in U.S. Pat. No. 4,782,120, the disclosure of which is specifically incorporated herein by reference, which copolymers are commercially available from Baroid Drilling Fluids, Inc. of Houston, Tex. under the trade designation Therma Thin have been found to be useful as dispersants for spacer fluids, cement slurries and mixtures of drilling fluids and cement slurries. The copolymers marketed under this trade designation include between 0 and 90% of an ethylenic acid residue selected from acrylic acid, methacrylic acid, itaconic acid, crotonic acid, isocrotonic acid, aconitic acid, fumaric acid, mesaconic acid, sinapic acid, undecylenic acid, angelic acid, hydroxyacrylic acid and maleic anhydride; between 2 and 100% of an acrylamide residue selected from acrylamide, methacrylamide and sulphonic-acrylamide-alkyl acids such as sulphonic 2-acrylamide-2-methyl-propane; and between 0 and 90% of a phosphoric acid-ethylenic alcohol ester residue wherein the ethylenic alcohol is selected from methacrylate and acrylate esters of ethylene glycol, propylene glycol, polyglycol and mixtures thereof. The copolymers marketed under this trade designation have a molecular weight of from 500 to 50,000.

Finally, acrylic acid polymers, acrylamide polymers, and sulfonated and/or phosphonated copolymers of acrylic acid and acrylamide are useful as dispersants for spacer fluids, cement slurries and mixtures of drilling fluids and cement slurries.

The water-solubility of the dispersant polymers according to the present invention is influenced by both the molecular weight of the polymer and the presence of sulfonate, phosphonate and phosphate groups on the polymer. As the molecular weight of a polymer increases its water-solubility decreases. As noted above, the polymers have a molecular weight, preferably, in the range of 1,000 to 15,000 and, most preferably, in the range of 2,000 to 10,000. The above molecular weight ranges are before sulfonation, phosphonation or phosphation and, accordingly, do not include the weighting of these groups.

The sulfonate, phosphonate and phosphate groups improve the water solubility of the polymers. When desired, the polymers of the present invention contain a sufficient number of sulfonate, phosphonate or phosphate groups to render the polymer water soluble.

Most polymers of the present invention can be prepared by conventional polymerization techniques that will produce a polymer having the desired characteristics, which techniques are well known to those of ordinary skill in the art. Other polymers such as the sulfo-alkyl amide and sulfo-acrylamide polymers, the copolymers of ethylenic acids, acrylamides and ethylenic esters of phosphoric acid or the sulfonated vinyl toluene-maleic acid copolymers and sulfonated vinyl toluene-maleic anhydride copolymers can be prepared according to the procedures set forth in U.S. Pat. Nos. 4,762,894, 4,782,120 and 4,518,510 respectively.

The sulfonate, phosphonate, phosphate and carboxylic acid groups on the polymers of the present invention preferably are present in neutralized form as alkali metals or ammonium salts.

The dispersants, preferably, are added to spacer fluids, cement slurries and mixtures of drilling fluids and cement slurries, as the case may be, at the rate of between 0.1 and 20.0 lbs. per 42-gallon barrel (ppb) of the original fluid, and preferably between 1.0 and 10.0 ppb.

According to the following examples, representative dispersant compositions were tested for their utility in a mud-to-cement dispersion and a cement dispersion. The dispersants were also tested for their utility in a mud-to-cement dispersion at high temperatures.

The rheological parameters indicated in the Examples which follow, including plastic viscosity (PV) indicated in centipoises and yield point (YP) indicated in pounds per hundred feet squared, were measured with a Model 35 Fann viscometer utilizing a #1 bob and sleeve and a #1 spring. A Fann viscometer uses a rotor and a bob which is attached to a spring, to measure the shear stress factor in a fluid. The bob and rotor are immersed in the fluid which is contained in a stationary test cup. The rotor, arranged in concentric alignment with the bob, causes the fluid to move at various shear rates, while the bob by means of the attached spring, measures the torque exerted on itself.

The dispersants of the present invention have utility in spacer fluids, cement slurries and mixtures of drilling fluids and cement slurries.

When added to spacer fluids, the dispersants modify the rheological properties of the fluids and result in fluids having a plastic viscosity of from 3 to 70 centipoises, preferably, from 5 to 50 centipoises and a yield point of from 2 to 50 lbs/100 ft$^2$, preferably, from 5 to 30 lbs/100 ft$^2$.

When added to cement slurries and mixtures of drilling fluids and cement slurries, the dispersants modify the rheological properties of the fluids and result in fluids having a plastic viscosity of from 10 to 400 centipoises, preferably, from 20 to 200 centipoises and a yield point of from 0 to 100 lbs/100 ft$^2$, preferably, from 5 to 50 lbs/100 ft$^2$.

EXAMPLE 1

Table 1 below shows a performance comparison in a mud-to-cement dispersion at room temperature and at 180° F. between various polymeric dispersants of the present invention and a sulfonated styrene-maleic anhydride copolymer preparation marketed by Chemlink under the trade designation SSMA 1000. SSMA 1000 has a 1 to 1 ratio of sulfonated styrene to maleic anhydride residues. As disclosed in U.S. Pat. No. 4,883,125, the disclosure of which is hereby specifically incorporated by reference, SSMA is useful as a dispersant for mixtures of drilling fluids and cement slurries in a mud-to-cement conversion process as it controls the rheological properties of the mixtures. Thus, the performance of the dispersants of the present invention can be evaluated in a mud-to-cement dispersion by comparison to the performance of SSMA in a mud-to-cement dispersion.

TABLE 1

| MTC Slurry Components | Mud/Cement Dispersion @ Room Temperature | Mud/Cement Dispersion @ 180° F. |
|---|---|---|
| 350 cc mud A | | |
| 3.5 g. SSMA 1000 | PV = 55 | PV = 46 |
| 5 cc accelerator | YP = 31 | YP = 24 |
| 300 g. "H" cement | | |
| 140 cc water | | |
| 350 cc mud A | | |
| 10 cc Therma-Thin | PV = 67 | PV = 87 |
| 5 cc accelerator | YP = 27 | YP = 33 |
| 300 g. "H" cement | | |
| 105 cc water | | |
| 350 cc mud A | | |
| 10 g. Narlex D-42 | PV = 56 | PV = 95 |
| 5 cc accelerator | YP = 35 | YP = 32 |
| 300 g. "H" cement | | |
| 105 cc water | | |
| 350 cc mud A | | |
| 10 cc ASP-718 | PV = 64 | |
| 5 cc accelerator | YP = 34 | |
| 300 g. "H" cement | | |
| 105 cc water | | |
| 350 cc mud B | | |
| 3 g. Narlex D-82 | PV = 37 | |
| 200 g. "H" cement | YP = 118 | |
| 35 cc water | | |

Mud A - 60.22% water, 04.42% bentonite, 00.75% Spersene (a chrome lignosulfonate, MI Drilling Fluids, Houston, TX), 00.25% sodium hydroxide, 12.64% Rev Dust (an altered calcium montmorillonite, Milwhite, Houston, TX), 21.73% barite. Mud B - 1 bbl H₂O, 15 ppb bentonite, 0.5 ppb Drispac Regular (a polyanionic cellulose, Drilling Specialties Co., Bartlesville, OK), 1.0 ppb Drispac Superlo (a polyanionic cellulose, Drilling Specialties Co., Bartlesville, OK; Drispac Regular has a higher MW and viscosity in relation to Drispac Superlo), 0.5 ppb Desco CF (a sulfomethylated tannin, Drilling Specialties Co., Bartlesville, OK), 0.5 ppb caustic, 111.3 ppb Rev Dust.

As shown in Table 1 the dispersants according to the present invention show good performance in comparison to SSMA in a mud-to-cement dispersion at room temperature and at 180° F.

EXAMPLE 2

Table 2 below shows a performance comparison in a cement dispersion at room temperature between various polymeric dispersants of the present invention, a sulfonated styrene-maleic anhydride copolymer preparation marketed by Chemlink under the trade designation SSMA 1000 and a condensed naphthalene sulfonate (a standard cement dispersant) marketed by Western Co. under the trade designation Western TF-4. As disclosed in U.S. Pat. Nos. 3,952,805 and 4,036,660, the disclosures of which are hereby specifically incorporated by reference, SSMA is useful as a dispersant for cement slurries. Thus, the performance of the dispersants according to the present invention can be evaluated in a cement slurry by comparison to the performance of SSMA and Western TF-4 in a cement slurry.

TABLE 2

| Cement Slurry Components | Cement Dispersion @ Room Temperature |
|---|---|
| 971 g. "H" Cement | PV = 110 |
| 296 g. H₂O | YP = −18 |
| 4.86 g. SSMA | |
| 971 g. "H" Cement | PV = 104 |
| 296 g. H₂O | YP = 45 |
| 4.86 g. Western TF-4 | |
| 971 g. "H" Cement | PV = 155 |
| 296 g. H₂O | YP = −30 |
| 4.86 g. (8.64 cc) Therma-Thin | |
| 971 g. "H" Cement | PV = 161 |
| 296 g. H₂O | YP = −32 |
| 4.86 g. D-42 | |
| 971 g. "H" Cement | PV = 107 |
| 296 g. H₂O | YP = −2 |
| 4.86 g. D-82 | |
| 971 g. "H" Cement | PV = 159 |
| 296 g. H₂O | YP = −33 |
| 4.86 g. (9.0 cc) ASP-718 | |

As shown in Table 2 the dispersants according to the present invention show excellent performance in comparison to SSMA and Western TF-4 in a cement dispersion at room temperature.

Although preferred embodiments of the present invention have been described in some detail herein, various substitutions and modifications may be made to the compositions of the invention without departing from the scope and spirit of the appended claims.

What is claimed is:

1. A slurry for use in drilling and completion of subterranean wells, comprising:
   a cement slurry; and
   from 0.1 to 20.0 pounds per 42.0 gallons of said cement slurry of a polymeric dispersant selected from the group consisting of a hydroxypropyl acrylate-acrylic acid copolymer; sulfonated vinyl toluene-maleic anhydride copolymer; sulfonated vinyl toluene-maleic acid copolymer; sulfonated methyl polyacrylamide; sulfonated ethyl polyacrylamide; sulfonated phenyl polyacrylamide; and copolymers of ethylenic acids, acrylamides and ethylenic esters of phosphoric acid.

2. A slurry according to claim 1, wherein said dispersant further includes one or more anion charge supplying functional groups selected from the group consisting of a sulfonate, phosphonate, phosphate and carboxylate group and wherein one or more of said groups are present in neutralized form as alkali metal salts or ammonium salts.

3. A slurry according to claim 1, wherein said copolymer of ethylenic acids, acrylamides and ethylenic esters of phosphoric acid comprises between 0 and 90% of an ethylenic acid residue wherein said ethylenic acid residue is acrylic acid, methacrylic acid, itaconic acid, crotonic acid, isocrotonic acid, aconitic acid, fumaric acid, mesaconic acid, sinapic acid, undecylenic acid, angelic acid, hydroxyacrylic acid or maleic anhydride; between 2 and 100% of an acrylamide residue wherein said acrylamide residue is acrylamide, methacrylamide or sulphonic-acrylamide-alkyl acids; and between 0 and 90% of a phosphoric acid-ethylenic alcohol ester residue wherein the ethylenic alcohol is methacrylate or acrylate esters of ethylene glycol, propylene glycol, polyglycol or mixtures thereof.

4. A slurry according to claim 1, wherein said slurry comprises from 1.0 to 10.0 pounds of said dispersant per 42.0 gallons of said slurry.

5. A slurry according to claim 1 wherein said dispersant has a molecular weight of from about 1,000 to about 15,000.

6. A slurry according to claim 1 wherein said dispersant has a molecular weight of from about 2,000 to about 10,000.

7. A slurry according to claim 1 wherein said slurry has a plastic viscosity of from about 10 to about 400 centipoises.

8. A slurry according to claim 1 wherein said slurry has a plastic viscosity of from about 20 to about 200 centipoises.

9. A slurry according to claim 1 wherein said slurry has a yield point of from about 0 to about 100 lbs/100 ft$^2$.

10. A slurry according to claim 1 wherein said slurry has a yield point of from about 5 to about 50 lbs/100 ft$^2$.

11. A mixture, comprising:
a drilling fluid;
a cement slurry; and
from 0.1 to 20.0 pounds per 42.0 gallons of said mixture of a polymeric dispersant selected from the group consisting of hydroxypropyl acrylate-acrylic acid copolymer; sulfonated vinyl toluene-maleic anhydride copolymer; sulfonated vinyl toluene-maleic acid copolymer; sulfonated methyl polyacrylamide; sulfonated ethyl polyacrylamide; sulfonated phenyl polyacrylamide; and copolymers of ethylenic acids, acrylamides and ethylenic esters of phosphoric acid.

12. A slurry according to claim 11, wherein said dispersant further includes one or more anion charge supplying functional groups selected from the group consisting of a sulfonate, phosphonate, phosphate and carboxylate group and wherein one or more of said groups are present in neutralized form as alkali metal salts or ammonium salts.

13. A mixture according to claim 11, wherein said copolymer of ethylenic acids, acrylamides and ethylenic esters of phosphoric acid comprises between 0 and 90% of an ethylenic acid residue wherein said ethylenic acid residue is acrylic acid, methacrylic acid, itaconic acid, crotonic acid, isocrotonic acid, aconitic acid, fumaric acid, mesaconic acid, sinapic acid, undecylenic acid, angelic acid, hydroxyacrylic acid or maleic anhydride; between 2 and 100% of an acrylamide residue wherein said acrylamide residue is acrylamide, methacrylamide or sulphonic-acrylamide-alkyl acids; and between 0 and 90% of a phosphoric acid-ethylenic alcohol ester residue wherein the ethylenic alcohol is methacrylate or acrylate esters of ethylene glycol, propylene glycol, polyglycol or mixtures thereof.

14. A mixture according to claim 11, wherein said mixture comprises from 1.0 to 10.0 pounds of said dispersant per 42.0 gallons of said mixture.

15. A mixture according to claim 11 wherein said dispersant has a molecular weight of from about 1,000 to about 15,000.

16. A mixture according to claim 11 wherein said dispersant has a molecular weight of from about 2,000 to about 10,000.

17. A mixture according to claim 11 wherein said mixture has a plastic viscosity of from about 10 to about 400 centipoises.

18. A mixture according to claim 11 wherein said mixture has a plastic viscosity of from about 20 to about 200 centipoises.

19. A mixture according to claim 11 wherein said mixture has a yield point of from about 0 to about 100 lbs/100 ft$^2$.

20. A mixture according to claim 11 wherein said mixture has a yield point of from about 5 to about 50 lbs/100 ft$^2$.

* * * * *